United States Patent Office.

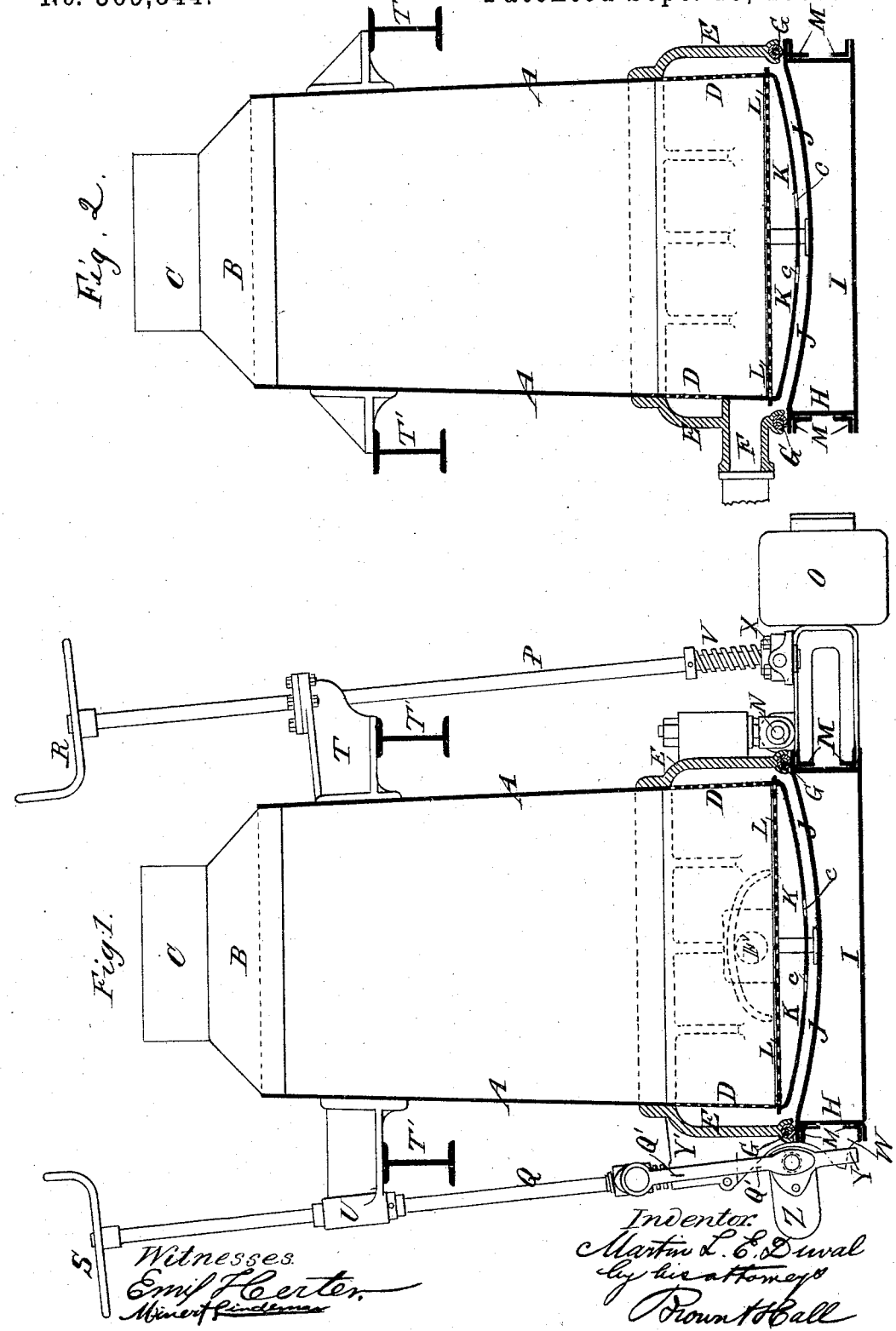

MARTIN LÉONARD EDMOND DUVAL, OF PARIS, FRANCE.

DIFFUSING APPARATUS.

SPECIFICATION forming part of Letters Patent No. 369,844, dated September 13, 1887.

Application filed August 12, 1886. Serial No. 210,699. (No model.) Patented in Spain August 7, 1883.

*To all whom it may concern:*

Be it known that I, MARTIN LÉONARD EDMOND DUVAL, a citizen of the Republic of France, residing at Paris, in said Republic, have invented a new and useful Improvement in Diffusing Apparatus for the Treatment of Sugar-Cane and Bagasse, of which the following is a specification, reference being had to the accompanying drawings.

My invention consists in the combinations, hereinafter described, with a colander-like vessel, of a movable double bottom or trap, and means of opening the said bottom or trap for the removal from the interior of the vessel of the spent cane or bagasse after its treatment therein.

Figures 1 and 2 in the accompanying drawings are central vertical sectional views, taken at right angles to each other, of a diffusion apparatus with my improvement.

A is the colander-like vessel, which might be cylindrical, but preferably of the truncated conical form, having the largest section at the base, as shown. The upper part of this vessel is open at C for the introduction of the crushed cane or other matters to be treated, and the lower parts of its sides are perforated all round, as shown at D, for the egress of the liquid from said vessel after it has passed through the said matters. The said vessel is supported in a fixed position on beams T, and the perforated lower parts of the sides of said vessel are surrounded by a fixed jacket, E, which is provided with an exit-tube, F, for the egress of the liquid received in said jacket from the said vessel. The said jacket has formed in its lower edge a circular groove, in which is received a tube, G, of india-rubber, filled with water under pressure, the said tube forming a packing to make a tight joint between the said jacket and a movable trap, which serves to close the bottom of said jacket and that of the vessel A. This trap is composed of a strong cylindrical base, H I, having secured to it the two concave plates J K and the flat perforated plate L. The said perforated plate forms the bottom proper of the diffusing-vessel A, and the two concave plates J K form a double bottom below plate L. The plate J has no holes in it, but plate K has holes $c$ $c$ near the center. The plate K is united at its margin with the plate L, but there is a free opening between the margin of the said plate K and the plate J. Some of the saccharated liquid passes from the lower part of the vessel A through the perforations D into the jacket E, and the rest passes through the perforated plate L and the holes $c$ $c$ in the concave plate K and into the space between the plates J K, at the open margin of which it escapes into the jacket E. From the jacket the liquid passes by a pipe, F, into any suitable receptacle.

The trap above described is attached to a cast-iron bed-plate or framing, M, furnished with a counterpoise, O, and pivoted on an arbor, N, supported by a piece of cast-iron secured to the jacket E; or, in other words, the said trap is hinged to the said jacket. The counterpoise O has for its object to completely balance the weight of the trap in order to facilitate its manipulation. This manipulation is effected by means of two spindles, P and Q, provided with cranks R and S, and guided by bearings T U, fixed to the beams T' T', which support the vessel A and its jacket E. The spindle P is capable of turning freely in the bearing T, and it is terminated at its lower end by a screw, V, working in a nut, X, secured on the bracket M in such a way that by turning the spindle one way or another it will open or close the trap or bottom of the diffuser. On the opposite side the trap is held closed by means of a counterpoise lever, Y, and of a cam, W, secured to the cylinder H. The spindle Q, attached by a stirrup, Q', to the lever Y, is terminated at its lower end by a screw, which acts on this stirrup and turns in a nut provided in a bracket, Y', which is secured to the jacket E, and which supports the fulcrum of the said lever Y, which, by the action of the eccentric counter-weight, Z, remains hooked under the cam W.

To open the apparatus at the moment when wished to empty it, it is sufficient to turn the crank S of the spindle Q, in order to produce the descent of the lever Y, which this movement pushes forward by reason of the form of the end portion of the cam W, and as soon as this cam is unhooked the trap-bottom opens freely under the action of the interior charge which is to be emptied out, combined with the movement of the stem P, which limits its descent. After having emptied the apparatus, the stem P is turned in an opposite direction and the trap returns by the action of the counterpoise O until it is brought to a closed position. On the other hand the lever Y places itself automatically under the cam W by the action of its counterpoise Z, and there is nothing more to do but to turn hard on the two spindles P and Q, in order that the joint shall be tightly screwed up, when the apparatus will be ready to receive a new charge of cane or bagasse. It will be seen that by means of this arrangement all the working can be done from the top of the apparatus without any loss of time and without the necessity of any manual labor to effect the emptying of the diffuser.

What I claim as my invention, and desire to secure by Letters Patent, is—

1. The combination, with the diffusing-vessel having the lower parts of its sides perforated, and the fixed jacket E, surrounding the said lower parts and provided with an outlet, F, of the hinged trap consisting of the base H I, the concave plates J K, secured to said base and having the space between them open at the margin, and the upper one, K, being provided with holes $c\ c$, and the perforated plate L, united with the said plate K, all substantially as herein described.

2. The combination, with the diffusing-vessel having its lower parts perforated, and having a jacket surrounding the said perforated parts, and a hinged counterbalanced trap forming a movable bottom to said vessel, of the screw-threaded rods P Q, the nuts therefor, the stirrup Q', the counterbalanced lever Y Z, and the cam W, all substantially as herein described, for the purpose of securing and manipulating the said trap, as herein set forth.

In testimony whereof I have signed this specification in the presence of two subscribing witnesses.

MARTIN LÉONARD EDMOND DUVAL.

Witnesses:
CH. CRÉMERS,
JOSEPH ZANTET.